W. B. ORIEL.
CHANGE SPEED AND REVERSING GEARING.
APPLICATION FILED JUNE 25, 1920.

1,401,636.

Patented Dec. 27, 1921.

Witness:
Harold O. Van Antwerp

Inventor:
William Byron Oriel
By Cyrus W. Rice
His Attorney.

W. B. ORIEL.
CHANGE SPEED AND REVERSING GEARING.
APPLICATION FILED JUNE 25, 1920.
1,401,636.
Patented Dec. 27, 1921.
5 SHEETS—SHEET 2.
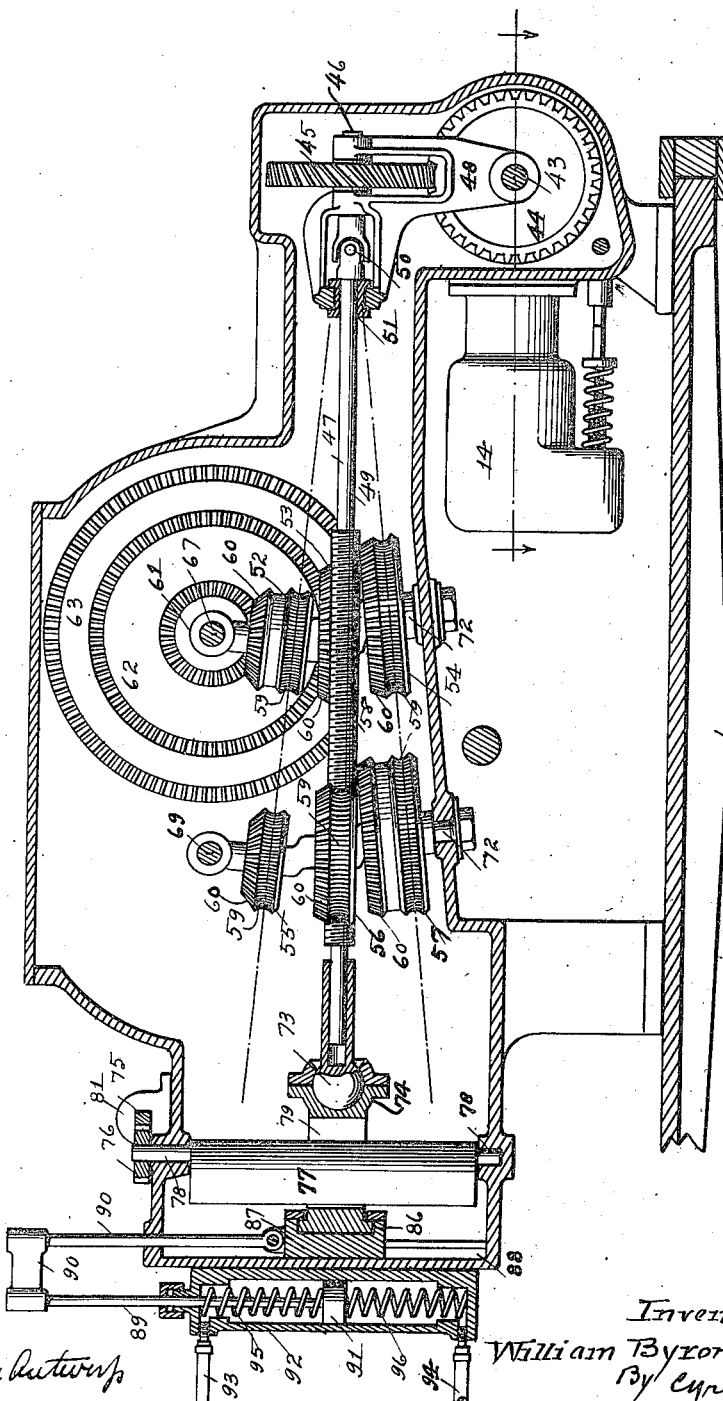
Inventor:
William Byron Oriel
By Cyrus W. Rice
his Attorney

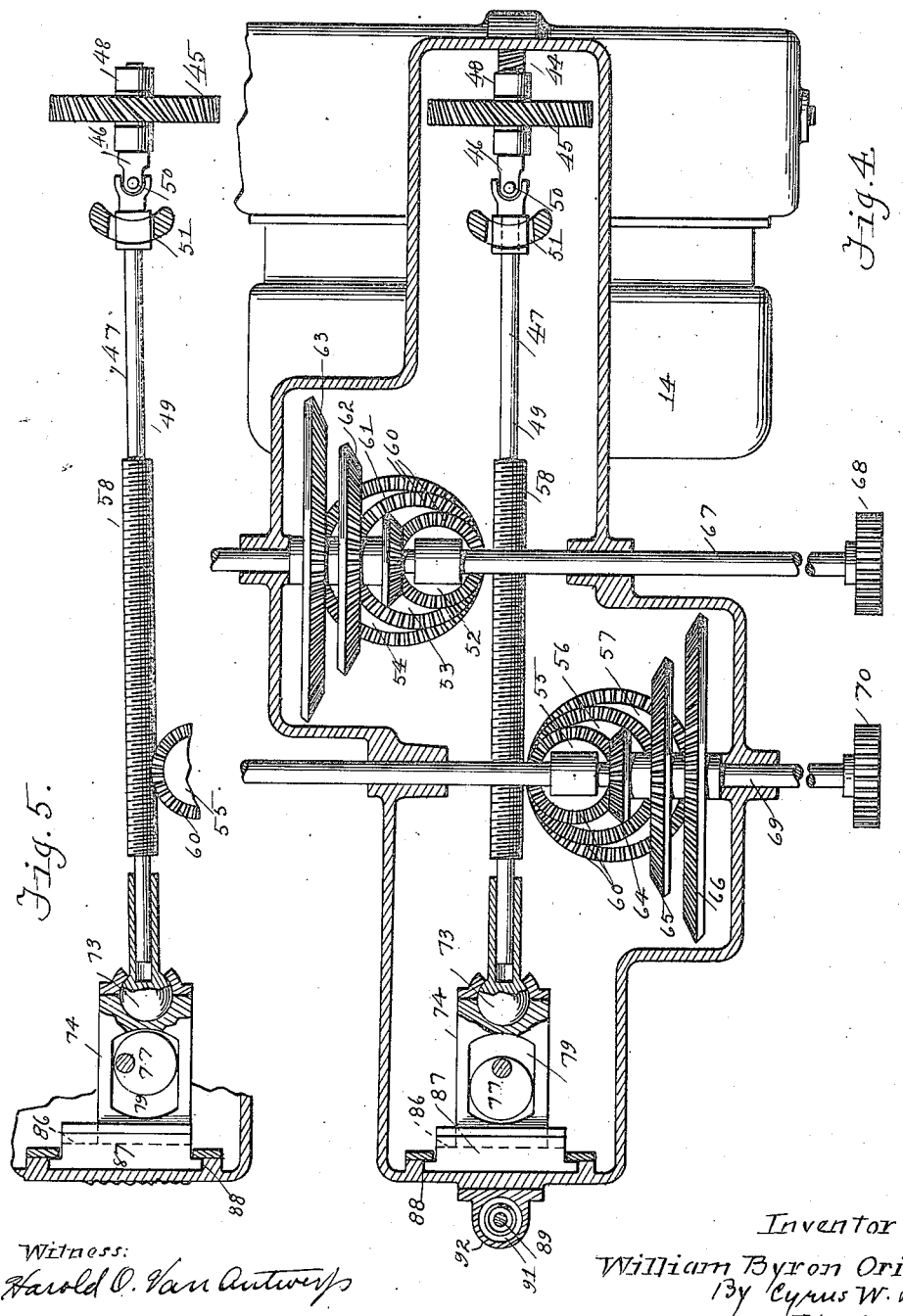

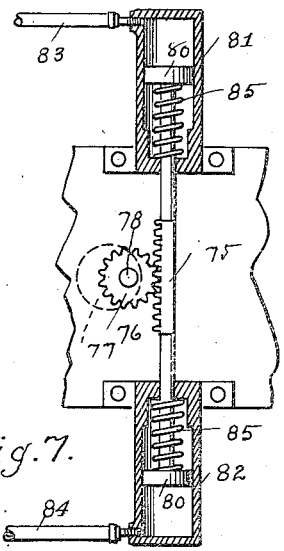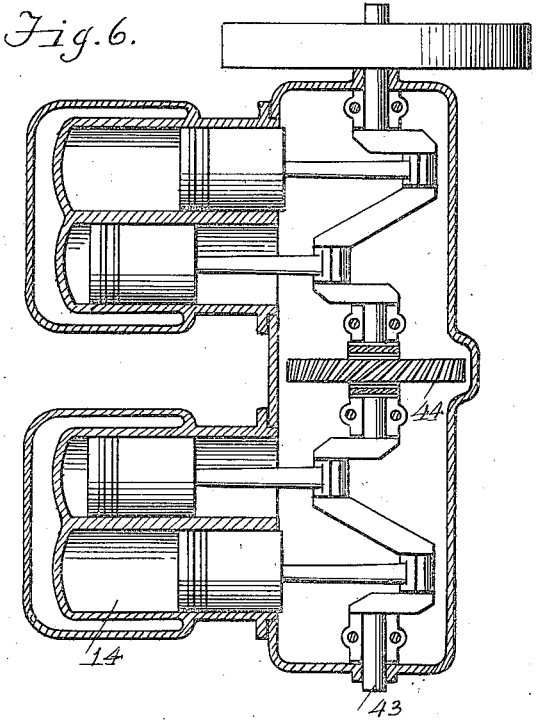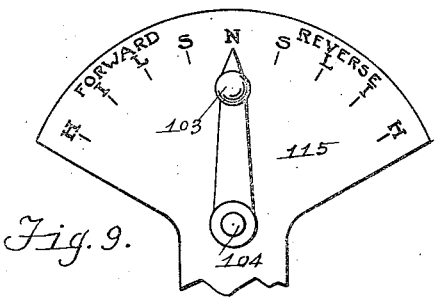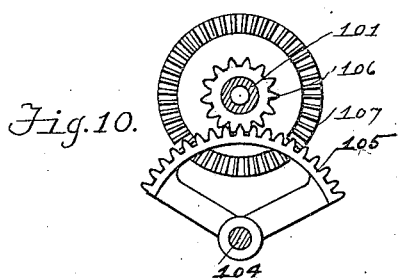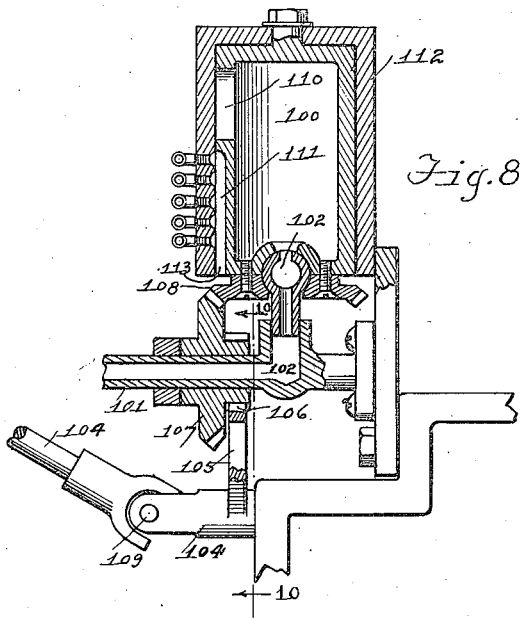

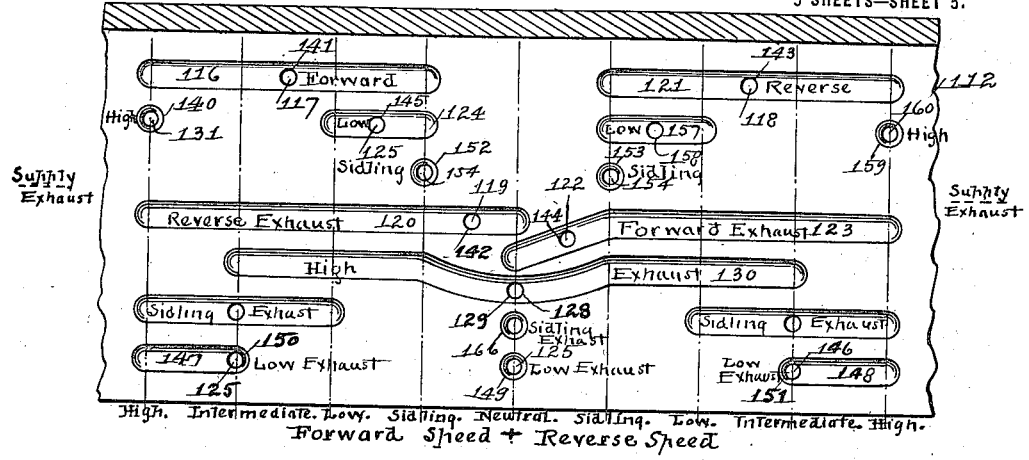
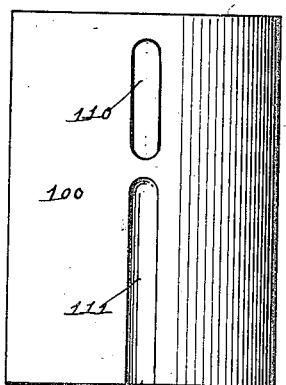
Fig. 11.
Fig. 12.
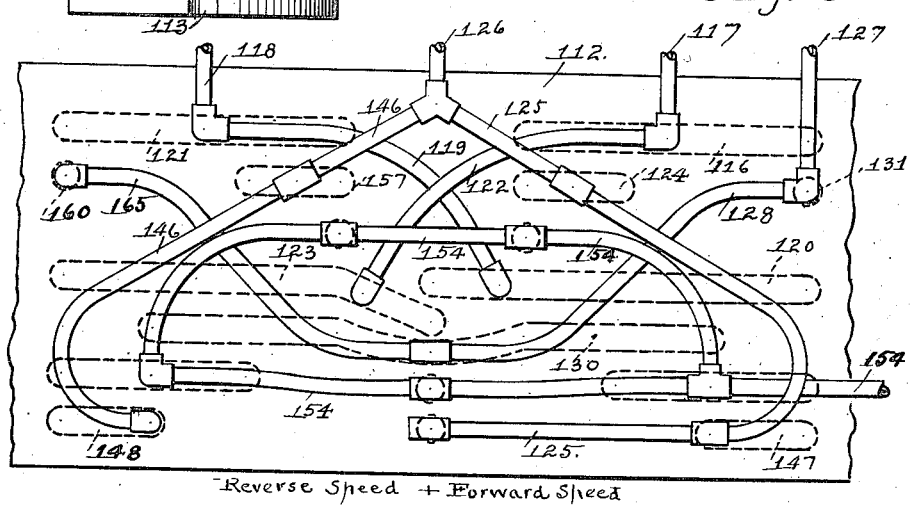
Fig. 13.

UNITED STATES PATENT OFFICE.

WILLIAM BYRON ORIEL, OF GRAND RAPIDS, MICHIGAN.

CHANGE-SPEED AND REVERSING GEARING.

1,401,636.  Specification of Letters Patent.  Patented Dec. 27, 1921.

Application filed June 25, 1920. Serial No. 391,736.

*To all whom it may concern:*

Be it known that I, WILLIAM BYRON ORIEL, a citizen of the United States, residing at Grand Rapids, in the county of Kent and State of Michigan, have invented new and useful Improvements in Change-Speed and Reversing Gearing, of which the following is a specification.

The present invention relates to change-speed and reversing gearing for motor-driven vehicles; and its object is, generally, to provide improved gearing of that character, especially adapted for use in vehicles designed to carry heavy loads, as large freight trucks and the like; and more particularly, to provide such a gearing having a rotatable driving element laterally movable or swingable into and out of driving engagement with any one of a plurality of driven elements, as change-speed gears; and further, to provide such a gearing having such a driving element so movable into and out of driving engagement with either one of forward-speed or reverse-speed driven elements or gears; and further, to provide such a gearing having such a driving element so movable into and out of driving engagement with any one of such change-speed and forward or reversing driven elements; and further, to provide means for thus moving or swinging said driving element and for holding the same in its moved or slid position.

These and any other objects hereinafter appearing are attained by, and the invention finds preferable embodiment in, the structure or structures hereinafter particularly described and illustrated by the accompanying drawings, in which:—

Fig. 3 is a central, vertical, longitudinal section of my gearing and connected parts;

Fig. 4 is a top plan view of the same, the casing thereof being sectioned through the bearings of the forward-speed and reverse-speed gears;

Fig. 5 is a top plan view of parts of the same shown in another position;

Fig. 6 is a central longitudinal sectional view of the vehicle's motor, with connected parts;

Fig. 7 is top plan view of a means for moving the driving element, shown partly in central section;

Fig. 8 is a longitudinal central sectional view of a valve for controlling the fluid for moving the driving element;

Fig. 9 is a face view of an indicator whereby the position of said valve is shown;

Fig. 10 is a view of certain means for operating said valve, (sectioned on line 10—10 of Fig. 8);

Fig. 11 is a side view of said valve itself;

Fig. 12 is a development of the inner surface of the casing of said valve; and

Fig. 13 is a development of the outer surface of said casing, showing the fluid connections therewith.

Figure 1:
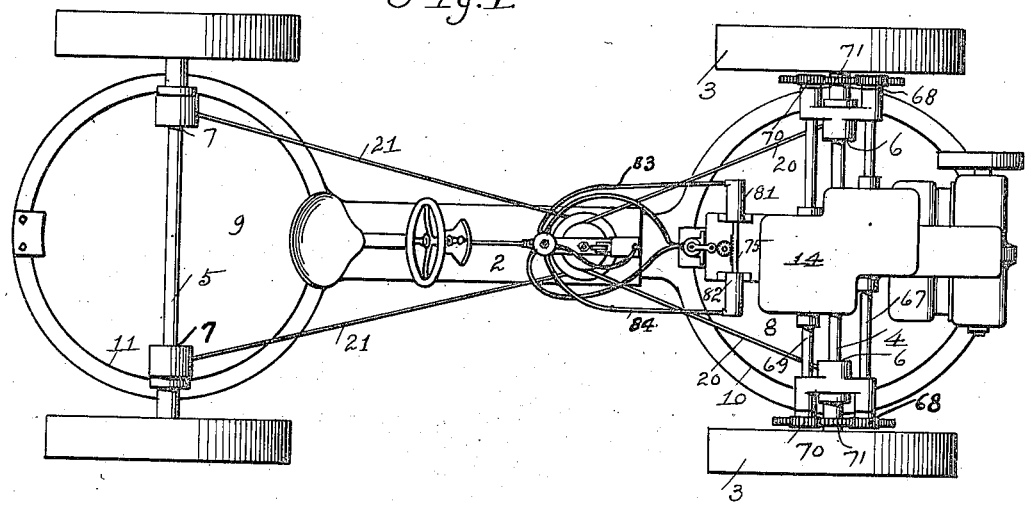
Figure 1 is a top plan view of a motor-driven vehicle to which my gearing is applied.
Figure 2:
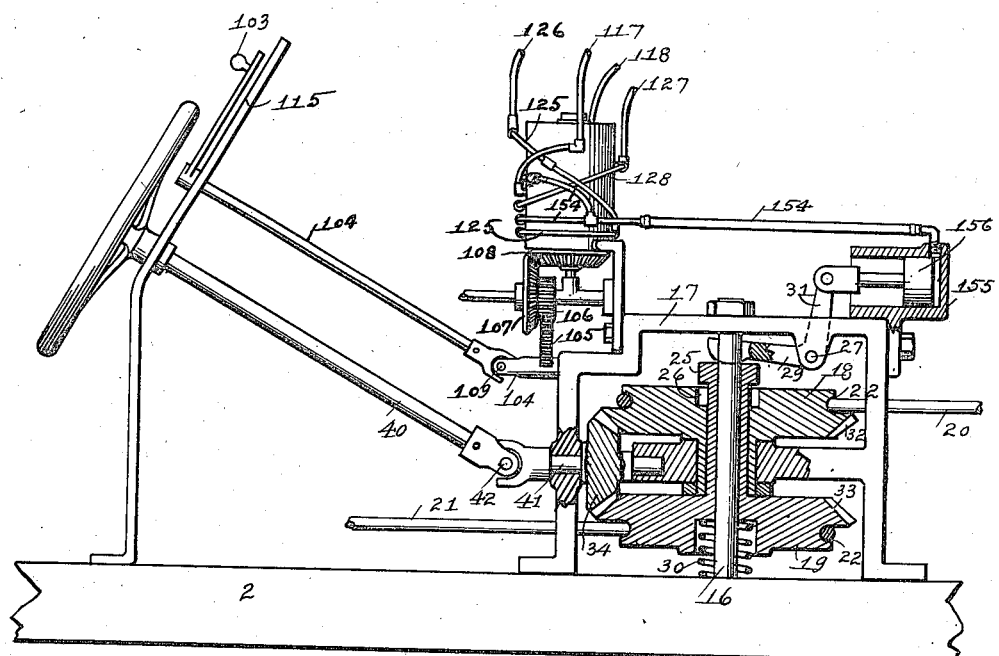
Fig. 2 is a side view (enlarged) of the middle portion thereof, certain parts being shown in central vertical section.

In the embodiment of the invention chosen for illustration by the drawings and for detailed description in the body of this specification, my gearing is shown applied to a motor-driven vehicle of the type illustrated and described in my pending application for patent, Serial Number 331,159, which vehicle is equipped with steering means such as are shown in said application. The two (front and rear) axles 4 and 5 of the vehicle are steerably turnable relatively to the frame 2 of the vehicle, being journaled at 6 and 7 on circular platforms 8 and 9 respectively, which platforms are turnable in bearings 10 and 11 on the frame. The front axle 4 is driven to propel the vehicle by the motor (designated generally 14) carried by the platform 8. The steering means whereby the axles are steerably turned comprises the following parts: On a spindle 16, suitably supported as by a member 17 on the vehicle frame, are journaled the rotatable elements 18 and 19, suitable motion-transmitting connections, as the flexible connections or cable 20 extending between one element 18 and the front axle 4 and like connections 21 extending between the other element 19 and the rear axle 5. These connections may be of any suitable type or form, as for instance the cables wound on drum portions 22 of the elements 18 and 19, shown, and pass therefrom to suitable points of connection with the axles or the turnable platforms 8, 9 on which said axles are journaled respectively. A clutch or coupling means, whereby these elements 18 and 19 may be coupled to turn together in the same direction or may be uncoupled to permit them to turn in opposite directions, comprises in the construction shown, a squared head 25 carried by the hub portion of the element 19 and adapted to couplingly engage in a correspondingly shaped socket 26 in the element 18; or to be disengaged therefrom when the parts are in the position shown in Fig. 2. To effect this coupling and uncoupling, the element 19 has an axial movement on the spindle 16, being pressed downwardly into coupling engagement by a suitable bell-crank lever 31, pivoted at 27, whose bifurcated arm 29 straddles the spindle 16 and engages the upper end of the hub portion of the element 19 and moves said element downwardly (by means hereinafter explained) against the pressure of a spring 30. These elements 18 and 19 have bevel gears 32, 33 on their adjacent sides, with both of which gears the rotatable gear member 34 meshes when the parts are in the position shown in Fig. 2, in which position the rotation of this member 34 turns said elements in opposite directions whereby the axles are inclined relatively to each other, thus steering the vehicle on a curve; but when the elements 18, 19 are coupled together, the gear member 34 meshes with the gear 32 of the element 18 only, and turns it and the element 19 in the same direction, whereby the axles are turned parallelly so that the vehicle "sidles" or is moved sidewise without curving in its travel. The gear member 34 may be rotated by the steering wheel on the steering shaft 40 connected to the shaft 41 of the gear member 34 by a universal joint 42.

The parts above described are shown in and are a part of the subject matter of my said pending application.

In the present invention, the crank shaft 43 of the vehicle's motor 14 carries a driving member, the skew gear 44, meshing with a skew gear 45 carried by a portion 46 of the rotatable driving element or shaft designated generally 47, journaled in a block 48 swingably mounted concentrically with the member 44. The main portion 49 of the driving element 47 is connected by a universal joint 50 to the portion 46 being swingable relatively to said block in a guide 51 therein. It will be seen that this rotatable driving element 47 is movable or swingable laterally both in a vertical and in a horizontal direction. At one side of this driving element 47 are mounted idling axially-stepped rotatable driven elements, (i. e., said elements have their axes laterally offset interrelatively), the change-speed gears 52, 53, 54 arranged side to side, the intermediate one thereof being adapted to propel the vehicle at "intermediate" speed, the smaller at "high" speed, and the larger at "low" speed. A like arrangement of driven elements 55, 56, 57 are similarly mounted at the opposite side of the driving element 47 as particularly shown in Fig. 4. To provide for this stepped axial mounting of the driven elements, their spindles are formed on the non-straight rods 72 as shown. A worm-portion 58 of the element 47 is adapted to drivingly engage the worm wheel teeth 59 of any one of the driven elements 52, 53, 54, 55, 56, 57 when the driving element 47 is laterally moved or swung to the position effecting such engagement. These six driven elements have also bevel-gear teeth 60 meshing with the bevel gears 61, 62, 63 respectively, at one side of the driving element 47, and bevel gears 64, 65, 66 respectively at the opposite side of the driving element. The gears 61, 62, 63 are carried by the shaft 67 which carries also the gears 68, while the gears 64, 65, 66 are carried by the shaft 69 which also carries the gears 70, both gears 68 and 70 meshing with the gears 71 carried by the forward wheels 3. It will be seen that when the driving element 47 is in mesh with either of the driven elements 52, 53, 54 the vehicle will be propelled in one direction, as forwardly; and that when said driving element is in mesh with either of the driven elements 55, 56, 57, the vehicle will be propelled the opposite way, as backwardly or in "reverse" direction.

To move the driving element 47 to desired driving engagement and to hold it in such engagement, various means may be provided, preferably the following:

The rear end of said element 47 is carried, as by the ball and socket joint 73, by a block 74 which is slidable horizontally by a rack 75 whose teeth mesh with a gear 76 carried by an eccentric 77 journaled at 78 and operating in a vertical slot 79 in said block. This rack is provided with piston heads 80 in the cylinders 81 and 82 respectively. As the operating fluid (as compressed air) is admitted through the pipe 83 or 84 to one cylinder and exhausted from the other the eccentric is turned to move or swing the driving element 47 horizontally in one direction or the other. Springs 85 press the rack to middle position (seen in Figs. 4 and 7) in which the driving element 47 engages none of the driven elements.

To move or swing the driving element 47 vertically the following means are shown:

The block 74 is slidable horizontally in a guide 86 in a block 87 which is slidable vertically in a guide 88 by a rod 89 (having connecting means 90 with the block 87), said rod having a piston head 91 in a cylinder 92. As the operating fluid is admitted to the upper end of the cylinder through the pipe 93 and exhausted from the cylinder's other end the blocks 74, 87, and driving element 47 are moved downwardly; and as the fluid is admitted to the lower end of the cylinder through the pipe 94 and exhausted from its upper end, the said blocks and the element 47 are moved upwardly. The springs 95, 96 press the said piston head to middle or "neutral" position, wherein the driving element 47 is adjacent the middle driven elements 53 and 56, such position being seen in Fig. 3. To control the flow of the operating fluid (as compressed air) from a suitable source (not shown) to the cylinders 81, 82 and 92, valve mechanism, having the rotary hollow valve 100 may be employed. The fluid passes into the interior of this valve through a pipe 101 having passages 102. The valve 100 is turned, as by the handle 103 of the rocking rod 104, carrying a gear segment 105 meshing with the gear 106 integral with the bevel gear 107 which meshes with the bevel gear 108 of the valve 100. A universal joint 109 is shown in the rod 104. A slot 110 through the valve permits the fluid to pass therefrom to said cylinders, and a groove or channel 111 in the valve's outer surface permits the fluid to be exhausted therefrom. Suitable fluid-carrying connections or pipes between said cylinders and the casing 112 of the valve are shown. The fluid is exhausted from the cylinders and into the channel 111 and thence out at the mouth 113 of the channel, passing through the same pipes which carried in to the cylinders from the valve 100 and through its slot 110. An arrangement of grooves or channels in the inner side of the valve's casing 112, whereby the air may be admitted to the cylinders and exhausted therefrom, is shown in the developed valve casing seen in Fig. 12; and such channels are indicated in dotted lines and the connections of the pipes thereto are shown in solid lines in the development of the outer surface of said casing seen in Fig. 13, the right hand side of Fig. 12 corresponding in position to the left hand side of Fig. 13. In the "neutral position" (indicated by the letter N on the indicator plate 115, seen in Fig. 9) of the handle 103, the valve is in that position in which its channel 111 registers with the "neutral" mark on the interior of the casing as developed in Fig. 12, whereby all the cylinders are exhausted. In said position (shown in Fig. 8) the valve's slot 110 registers with none of the fluid-supply outlets through the valve casing leading to the cylinders. (The exhaust portion of the casing is below the horizontal line marked "supply," "exhaust" in Fig. 12 and the portion of the casing whereby fluid is supplied to the cylinders is above said line.) As the handle 103 is moved toward the left-hand side of Fig. 9, the valve is turned to that position in which air is admitted to cylinder 81 to engage the driving element 47 with one of the "forward speed" driven elements 52, 53, or 54; and as the handle 103 is moved toward the right-hand side of Fig. 9, the valve is turned to that position in which air is admitted to cylinder 82 to engage the driving element 47 with one of the "reversing" driven elements 55, 56 or 57. When the handle 103 is moved in either of said directions and to "L," "I," or "H" (as marked on the indicator seen in Fig. 9), the air is thereby controlled to operate the piston 91 to move the driving element 47 vertically into registration with the "low speed," "intermediate speed" or "high speed" driven elements 54, 57 or 53, 56 or 52, 55 respectively, on one side or the other of the driving element. It will thus be seen that when the valve is turned to register its slot 110 and channel 111 with any of the positions of the valve's casing shown at the left-hand side of the vertical middle line marked "Neutral" in Fig. 12, "forward speed" is attained; but when said slot and channel are turned to register with the casing's positions on the right-hand side of said neutral mark in Fig. 12, "reverse speed" is attained.

When the valve is turned to bring its slot 110 and groove 111 into the following registrations with the channels in the valve casing and the angularly disposed pipe openings (indicated by circles in Fig. 12) through the casing, the following results take place:

To effect all "forward speed" operations, the channel 116 in registration with the slot 110 admits the fluid through pipe opening 141, pipe 117, 83, into cylinder 81, thus moving the driving element 47 toward the "forward speed" driven elements 52, 53, 54; the fluid from cylinder 82 being exhausted through pipe 84, 118, 119, opening 142, into channel 120 and out through the valve's channel 111. To effect all "reverse speed" operations, the channel 121 in registration with slot 110 admits the fluid through pipe opening 143, pipe 118, 84, into cylinder 82, thus moving the driving element 47 toward the "reverse speed" driven elements 55, 56, 57; the fluid from cylinder 81 being exhausted through pipe 83, 117, 122, opening 144, into channel 123 and out through the valve's channel 111. The valve may be turned to various positions while the channels 116 or 121 remains in registration with slot 110, to wit: In "forward speed" operation, the channel 124 in registration with slot 110 admits the fluid through opening 145, pipe 125, 126, 93, into the upper end of cylinder 92, thereby moving the driving element 47 to the level of the "low speed" driving elements 54, 57; the fluid from the opposite end of said cylinder being exhausted through pipe 94, 127, 128, opening 129 into channel 130. In "forward speed" operation, the opening 140 in registration with slot 110 admits the fluid through opening 140, pipe 136

131, 127, 94 into the lower end of cylinder 92, thereby moving the driving element 47 to the level of the "high speed" driving elements 52, 55; the fluid from the opposite end of said cylinder being exhausted through pipe 93, 126, 125, opening 150, to channel 147. In "reverse speed" operation, the channel 157 in registration with the slot 110, admits the fluid through opening 158, pipe 146, 126, 93, to move the driving element 47 into its "low speed" operation in the same manner as its "low speed" operation is effected in the "forward speed" position of the parts, the exhaust being also in the same manner. Also, in "reverse speed" operation, the opening 159 in registration with the slot 110, admits the fluid through opening 159, pipe 160, 165, 128, 127, 94 to move the driving element into its "high speed" operation in the same manner as its "high speed" operation is effected in the "forward speed" position of the parts, the exhaust being also in the same manner. "Intermediate speed" in forward or reverse driving is attained by turning the valve to bring its slot 110 and channel 111 into registration with the casing's mark "Intermediate" at the left-hand side of Fig. 12 for "forward movement," or its said mark at the right-hand side of said figure for "reverse movement," the springs 95, 96, holding the driving element 47 at the level of the "intermediate speed" driven elements 53, 56. The axles 4, 5, may be moved parallelly to steer the vehicle in a "sidling" course, (as above explained) by turning the valve's slot 110 into registration with the casing's opening 152 for forward movement, or with the opening 153 for reverse movement, said openings communicating with the pipe 154 leading to the cylinder 155 and actuating its piston 156 to swing the bell-crank lever 31 and thus couple the elements 18, 19 together. When the valve is turned to bring the opening 166 into registration with the valve's channel 111, the fluid exhausts thereinto, through said pipe 154. The position of the valve 100 whereby the sidling forward movement of the vehicle takes place is indicated by the handle 103 moved to the letter "S" at the left-hand side of Fig. 9; and the valve's position whereby the sidling reverse movement of the vehicle takes place is indicated by said handle moved to the letter "S" at the right-hand side of said figure.

The invention being intended to be pointed out in the claims, is not to be limited to or by details of construction of the particular embodiment thereof illustrated by the drawings or hereinbefore described.

I claim:

1. In an organization of the character described; rotatable driven elements arranged side to side on axes laterally offset interrelatively; a single laterally-movably-mounted rotatable driving element arranged at the same side of the axes of all said driven elements and adapted to be moved laterally into and out of driving engagement with said driven elements severally.

2. In an organization of the character described; rotatable driven elements arranged side to side on axes laterally offset interrelatively; a single laterally-movably-mounted rotatable driving element arranged at the same side of the axes of all said driven elements and adapted to be moved laterally into and out of driving engagement with said driven elements severally; means for moving laterally and holding the driving element in such engagement.

3. In an organization of the character described; rotatable change-speed gears arranged side to side on axes laterally offset interrelatively; a single laterally-movably-mounted rotatable driving element arranged at the same side of the axes of all said gears and adapted to be moved laterally into and out of driving engagement with said gears severally.

4. In an organization of the character described; rotatable change-speed gears arranged side to side on axes laterally offset interrelatively; a single laterally-movably-mounted rotatable driving element arranged at the same side of the axes of all said gears and adapted to be moved laterally into and out of driving engagement with said gears severally; means for moving laterally and holding the driving element in such engagement.

5. In an organization of the character described; a single laterally-movably-mounted rotatable driving element; rotatable driven elements arranged side to side at one side of the driving element; rotatable driven elements arranged side to side at the opposite side of the driving element; the driving element being adapted to be moved laterally into and out of driving engagement with the driven elements severally.

6. In an organization of the character described; a single laterally-movably-mounted rotatable driving element; rotatable driven elements arranged side to side at one side of the driving element; rotatable driven elements arranged side to side at the opposite side of the driving element; the driving element being adapted to be moved laterally into and out of driving engagement with the driven elements severally; means for moving laterally and holding the driving element in such engagement.

7. In an organization of the character described; a laterally-movably-mounted rotatable element having a worm portion; axially-stepped change-speed driven elements arranged side to side at one side of the driving element and having gear teeth and worm-wheel teeth; axially-stepped change-speed driven elements arranged side to side at the opposite side of the driving element and having gear teeth and worm-wheel teeth; the driving element being adapted to be moved laterally to bring its worm portion into and out of mesh with the worm-wheel teeth of the driven elements severally; gears meshing with and driven by the gear teeth of the driven elements respectively.

8. In an organization of the character described; a laterally-movably-mounted rotatable element having a worm portion; axially-stepped change-speed driven elements arranged side to side at one side of the driving element and having gear teeth and worm-wheel teeth; axially-stepped change-speed driven elements arranged side to side at the opposite side of the driving element and having gear teeth and worm-wheel teeth; the driving element being adapted to be moved laterally to bring its worm portion into and out of mesh with the worm-wheel teeth of the driven elements severally; gears meshing with and driven by the gear teeth of the driven elements respectively; means for moving laterally the driving element and holding its worm portion in such engagement.

9. In an organization of the character described; a rotatable driving member; a block swingably mounted concentrically with said member; a driving element rotatably mounted on the block and having a portion swingable relatively thereto on an axis transverse to the block's axis, and being rotated by said member; rotatable driven elements arranged side to side at one side of the driving element; rotatable driven elements arranged side to side at the opposite side of the driving element; the driving element being adapted to be swung into and out of driving engagement with the driven elements respectively.

10. In an organization of the character described; a rotatable driving member; a block swingably mounted concentrically with said member; a driving element rotatably mounted on the block and having a portion swingable relatively thereto on an axis transverse to the block's axis, and being rotated by said member; rotatable driven elements arranged side to side at one side of the driving element; rotatable driven elements arranged side to side at the opposite side of the driving element; the driving element being adapted to be swung into and out of driving engagement with the driven elements respectively; means for swinging and holding the driving element in such engagement.

11. In an organization of the character described; a rotatable driving element swingably mounted adjacent one of its ends; rotatable driven elements arranged side to side at one side of the driving element; rotatable driven elements arranged side to side at the opposite side of the driving element; a block carrying the opposite end of the driving element; a slidably mounted second block on which the first block is mounted slidably in a direction transverse to the slidable movement of the second block; means for swinging and holding the driving element in driving engagement with the driven elements severally and comprising means for sliding and holding the first block in slid position and means for sliding and holding the second block in slid position.

12. In an organization of the character described; a rotatable driving element swingably mounted adjacent one of its ends; rotatable driven elements arranged side to side at one side of the driving element; rotatable driven elements arranged side to side at the opposite side of the driving element; a block carrying the opposite end of the driving element; a slidably mounted second block on which the first block is mounted slidably in a direction transverse to the slidable movement of the second block; means for swinging and holding the driving element in driving engagement with the driven elements severally and comprising a cylinder having a piston and means for thereby sliding and holding the first block in slid position and a cylinder having a piston and means for thereby sliding and holding the second block in slid position.

13. In an organization of the character described; a rotatable driving element swingably mounted adjacent one of its ends; rotatable driven elements arranged side to side at one side of the driving element; rotatable driven elements arranged side to side at the opposite side of the driving element; a block carrying the opposite end of the driving element; a slidably mounted second block on which the first block is mounted slidably in a direction transverse to the slidable movement of the second block; means for swinging and holding the driving element in driving engagement with the driven elements severally and comprising a cylinder having a piston and means for thereby sliding and holding the first block in slid position and a cylinder having a piston and means for thereby sliding and holding the second block in slid position; a rotary valve controlling the admission of the piston-moving fluid into the cylinders.

In testimony whereof I have hereunto set my hand at Grand Rapids, Michigan, this 21st day of June, 1920.

WILLIAM BYRON ORIEL.